H. G. LAPSLEY.
RADIATOR COVER.
APPLICATION FILED OCT. 9, 1920.
1,399,435.
Patented Dec. 6, 1921.
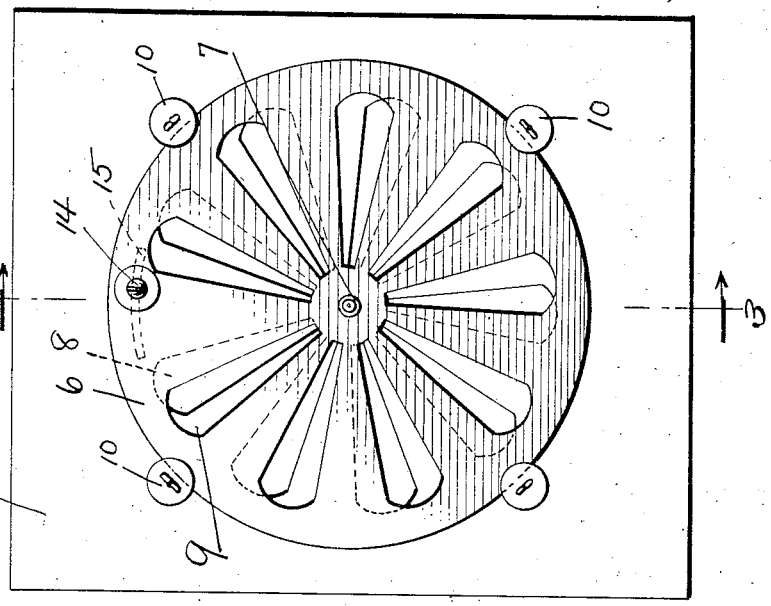
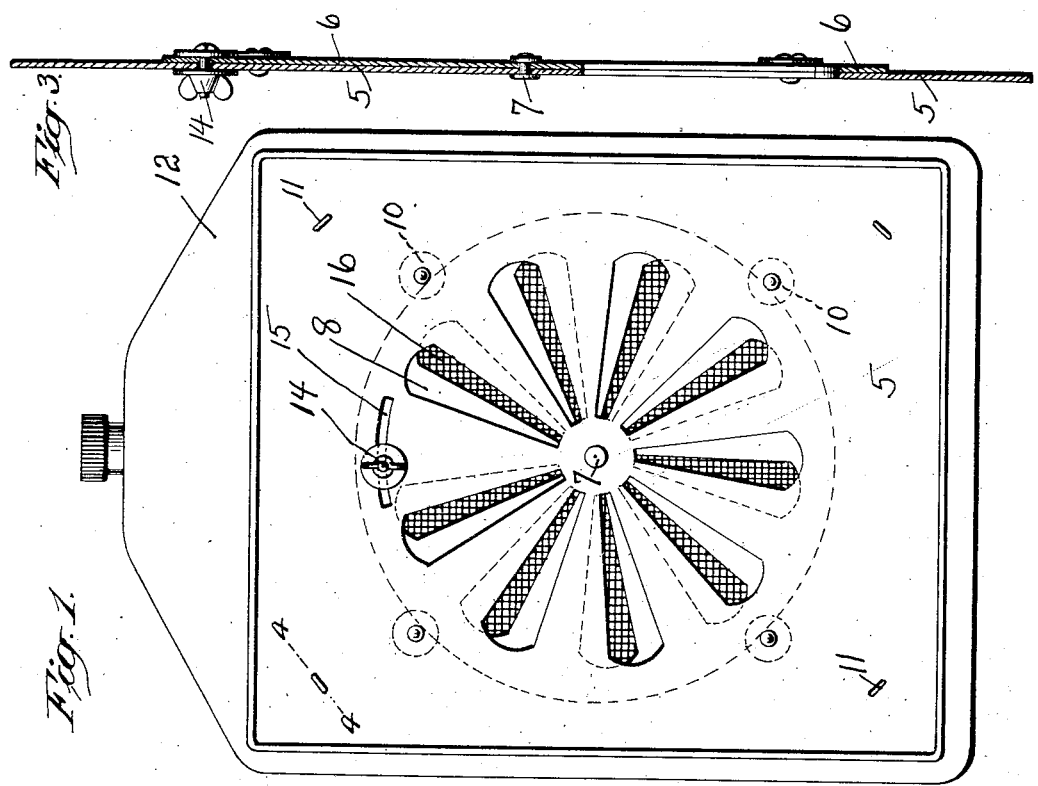
INVENTOR
Howard G. Lapsley
BY
Archibald Cox
his ATTORNEY

UNITED STATES PATENT OFFICE.

HOWARD G. LAPSLEY, OF PLAINFIELD, NEW JERSEY.

RADIATOR-COVER.

1,399,435.

Specification of Letters Patent.

Patented Dec. 6, 1921.

Application filed October 9, 1920. Serial No. 415,923.

*To all whom it may concern:*

Be it known that I, HOWARD G. LAPSLEY, a citizen of the United States, residing at Plainfield, in the county of Union and State of New Jersey, have invented certain new and useful Improvements in Radiator-Covers, of which the following is a specification.

The present invention relates to an improvement in radiator covers for automobiles.

It has been proposed heretofore to provide the front of automobile radiators with various types of covers, whereby the amount of air admitted to the radiator and to the engine behind the radiator may be regulated according to the state of the weather and to the temperature. These radiator covers, however, as heretofore constructed, have been for the most part permanently built into the auomobile and have been more or less complicated in construction and consequently relatively costly to manufacture and expensive to purchase. It is one object of the present invention to produce a radiator cover of such simple construction that it will be efficient in use, cheap to manufacture and of great durability, having few parts and these not liable to get out of repair in use. Another object of the invention is to produce a radiator cover adapted for application to any usual form of radiator. A further object of the invention is to produce a radiator cover which may be readily attached to and as readily detached from any usual construction of automobile radiator. With these and other objects in view, the invention consists in the improved radiator cover hereinafter described and particularly pointed out in the appended claims.

In the accompanying drawings illustrating the preferred embodiment of the invention, Figure 1 is a front elevation of an automobile radiator showing the improved radiator cover in position thereon; Fig. 2 is a rear elevation of the improved radiator cover; Fig. 3 is a section taken along the line 3—3 of Fig. 2; and Fig. 4 is an enlarged detailed section taken along the line 4—4 of Fig. 1.

The improved radiator cover as illustrated in the drawings comprises two plates, a front or stationary plate 5 and a rear or movable plate 6. The rear or movable plate 6 is disk like in form and is pivoted at its center 7 to the front or stationary plate 5, which is preferably rectangular in outline and of such size that by trimming it may be adapted for application in any usual size of radiator. The front plate 5 is provided with a series of radially disposed slots or openings 8 and the movable plate 6 is provided with corresponding series of radially disposel slots or openings 9. The two series of holes or slots are adapted to register with each other.

To prevent the edges of the movable plate 6 from turning up or being displaced with respect to the stationary plate 5, a series of washers 10 are provided, secured to the stationary plate 5 and spaced apart therefrom, so that the movable plate 6 is free to move between the washers and the stationary plate. The stationary plate is secured in position to the front of the automobile radiator by means of U-shaped staples 11, which may conveniently be placed at the corners of the radiator as shown in Fig. 1.

During the relatively mild weather of spring, summer and autumn months, the radiator cover will be left off the automobile, but on the approach of cold weather it will oe attached thereto, in the manner indicated in Figs. 1 and 4. If desired, the outer edges of the stationary plate 5 may be extended beyond the edges of the radiato so that the rim or shell 12 of the radiator will fit thereover and thus aid in securing the radiator cover in place. If the weather is only moderately cold, the movable plate 6 will be so adjusted that the slots in the two plates will register. The bolt 14, the rear end of which is secured to the movable plate 6 and the front of which projects through an arcuate slot 15 in the stationary plate 5, secures the movable plate 6 in adjusted position. As the weather becomes colder and less ventilation is required, the movable plate 6 will be adjusted so that its solid portion will cover more and more of the slots in the stationary plate. In Fig. 1 the movable plate 6 has been adjusted so as to uncover substantially one-half of each of the slots in the stationary plate and thereby expose the automobile radiator 16.

It will be recognized from the foregoing description that the radiator cover of the present invention is simple in construction and, therefore, may be cheaply and easily manufactured, is obviously efficient in use, is of such construction that continued use will not impair its efficiency, that it has only one moving part and this so constructed as not liable to get out of repair easily and that the device may be easily and quickly attached to and detached from any usual construction of automobile radiator.

Having thus described the invention what I claim as new is:

A radiator cover comprising a relatively flat stationary plate adapted to lie flat in front of the radiator, said stationary plate having a series of radially disposed slots therein, a movable plate pivoted to the stationary plate and provided with a series of radially disposed slots corresponding to the slots in the stationary plate, a bolt carried by the movable plate and passed through an arcuate slot in the stationary plate for securing the movable plate in adjusted position relatively to the stationary plate, and staples adapted to pass through the radiator for securing the stationary plate thereto.

HOWARD G. LAPSLEY.